(12) United States Patent
Riley et al.

(10) Patent No.: US 11,340,169 B2
(45) Date of Patent: *May 24, 2022

(54) SOLID FLUORESCENCE STANDARD

(71) Applicant: BioFire Defense, LLC, Salt Lake City, UT (US)

(72) Inventors: Patrick L. Riley, Salt Lake City, UT (US); Richard David Abbott, Draper, UT (US); Lyle M. Nay, Park City, UT (US); Sarah M. Fowden, Bountiful, UT (US)

(73) Assignee: BIOFIRE DEFENSE, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,319

(22) Filed: Feb. 26, 2020

(65) Prior Publication Data
US 2020/0191718 A1 Jun. 18, 2020

Related U.S. Application Data

(62) Division of application No. 16/061,870, filed as application No. PCT/US2016/066998 on Dec. 15, 2016, now Pat. No. 10,613,031.
(Continued)

(51) Int. Cl.
*G01N 21/64* (2006.01)
*B41M 3/14* (2006.01)
(Continued)

(52) U.S. Cl.
CPC ........ *G01N 21/6456* (2013.01); *B01L 3/5085* (2013.01); *B01L 7/52* (2013.01);
(Continued)

(58) Field of Classification Search
CPC .... B01L 3/5085; B01L 7/52; B01L 2200/148; B41M 3/144; G01N 2021/6421;
(Continued)

(56) References Cited

U.S. PATENT DOCUMENTS

| | | |
|---|---|---|
| 2,346,661 A | 4/1944 | Cannon et al. |
| 5,689,110 A | 11/1997 | Dietz et al. |

(Continued)

FOREIGN PATENT DOCUMENTS

| | | |
|---|---|---|
| CN | 1597307 A | 3/2005 |
| CN | 101092487 A | 12/2007 |

(Continued)

OTHER PUBLICATIONS

International Search Report and Written Opinion, PCT/US2016/066998, US International Search Authority, dated May 4, 2017.

*Primary Examiner* — Tri T Ton
(74) *Attorney, Agent, or Firm* — Workman Nydegger

(57) ABSTRACT

A solid fluorescence standard that can be used to calibrate and/or normalize a device (e.g., a scientific instrument) that is configured for generating and collecting fluorescence data. A fluorescence standard disclosed herein includes an adhesive (e.g., a low viscosity, substantially optically transparent, solvent-free, radiation curable adhesive, such as, but not limited to, a UV curable adhesive), and a selected quantity of fluorescent particles (e.g., quantum dots) dispersed in the adhesive. The adhesive and the fluorescent particles are mixed together and disposed in a sample well. The adhesive is then cured and solidified, which yields a solid fluorescence standard in the well.

19 Claims, 10 Drawing Sheets

Related U.S. Application Data

(60) Provisional application No. 62/269,206, filed on Dec. 18, 2015.

(51) Int. Cl.
  *G01N 21/27* (2006.01)
  *B01L 3/00* (2006.01)
  *B01L 7/00* (2006.01)

(52) U.S. Cl.
  CPC ........... *B41M 3/144* (2013.01); *G01N 21/278* (2013.01); *G01N 21/6452* (2013.01); *B01L 2200/148* (2013.01); *G01N 2021/6421* (2013.01); *G01N 2021/6439* (2013.01)

(58) Field of Classification Search
  CPC ......... G01N 2021/6439; G01N 21/278; G01N 21/6452; G01N 21/6456
  USPC .......................................... 356/243.1–243.8
  See application file for complete search history.

(56) References Cited

U.S. PATENT DOCUMENTS

| | | |
|---|---|---|
| 7,670,832 B2 | 3/2010 | Wittwer et al. |
| 8,394,608 B2 | 3/2013 | Ririe et al. |
| 8,940,526 B2 | 1/2015 | Ririe et al. |
| 9,102,911 B2 | 8/2015 | Ririe et al. |
| 2002/0048817 A1 | 4/2002 | Yekta et al. |
| 2002/0098588 A1 | 7/2002 | Sammak et al. |
| 2003/0012702 A1 | 1/2003 | Hudson |
| 2003/0157523 A1* | 8/2003 | Frantz ................... G01N 33/554 506/23 |
| 2005/0287040 A1 | 12/2005 | Giebeler et al. |
| 2006/0017925 A1 | 1/2006 | Sevick-Muraca et al. |
| 2006/0127275 A1 | 6/2006 | Holl et al. |
| 2006/0275182 A1 | 12/2006 | Hudson |
| 2008/0038835 A1 | 2/2008 | Westphal et al. |
| 2011/0043618 A1 | 2/2011 | Salisbury et al. |
| 2013/0170192 A1 | 7/2013 | Wu et al. |
| 2014/0339474 A1* | 11/2014 | Casey .................... C09K 11/02 252/301.36 |
| 2015/0015876 A1* | 1/2015 | Phillips .................. G01N 21/01 356/243.1 |
| 2015/0099291 A1 | 5/2015 | Ririe et al. |
| 2015/0232916 A1 | 8/2015 | Rasmussen et al. |
| 2018/0372639 A1* | 12/2018 | Riley ................. G01N 21/6456 |

FOREIGN PATENT DOCUMENTS

| | | |
|---|---|---|
| CN | 201287894 Y | 8/2009 |
| CN | 101979544 A | 2/2011 |
| CN | 104781459 A | 7/2015 |
| DE | 102004047593 A1 | 4/2006 |
| EP | 1703271 A1 | 9/2006 |
| WO | 2006/007766 A1 | 1/2006 |
| WO | 2009/127424 A2 | 10/2009 |
| WO | 2012/075360 A1 | 6/2012 |
| WO | 2014/152918 A1 | 9/2014 |

* cited by examiner

SOLID FLUORESCENCE STANDARD

CROSS-REFERENCE TO RELATED APPLICATIONS

This Application is a divisional of U.S. application Ser. No. 16/061,870, filed Jun. 13, 2018, which is a nationalization of PCT Application No. PCT/US2016/066998, filed Dec. 15, 2016, which claims the benefit of and priority to U.S. Provisional Application No. 62/269,206, filed Dec. 18, 2015, each of which is incorporated by reference herein in their entirety.

BACKGROUND

Fluorescence refers to the short-duration, spontaneous emission of light of one wavelength upon excitation by another, shorter wavelength of light. Substances that fluoresce are generally referred to as fluorophores. There are numerous natural and synthetic fluorophores, including, but not limited to, chemical dyes and mineral substances.

Conventional fluorescence standards or fluorescent dyes generally are composed of organic compounds with extended aromatic, pi bonding structures. The basis for fluorescence in these dyes is that the molecules absorb light of a given wavelength range (e.g., UV or visible light) and re-emit a portion of the absorbed energy at a known, different wavelength, often a longer wavelength. Absorption of light generally leads to excitation of electrons in the pi structure to a higher energy state; re-emission occurs when the electrons relax to their ground state. These dyes are used in a variety of different biological assays, for example, where the fluorescence signals they emit can provide information about the system under study.

A number of mineral substances are also known to fluoresce. However, most minerals do not fluoresce when pure. It takes certain impurities in certain quantities to make the mineral fluoresce. Such impurities are called "activators." Different activators can make the same mineral fluoresce in different colors. There are a few minerals that will fluoresce when pure. These are called "self-activated" minerals, and include scheelite, powellite, and several uranium minerals. Other common fluorescent minerals include calcites (with a variety of activators), rubies, and sapphires.

However, many chemical fluorescence standards and fluorescent dyes have one or more of the following disadvantages: (A) They are good at time zero, but they are not stable over the long term. That is, the dyes decay rapidly, they are subject to photobleaching (especially under extended illumination and when illuminated with high intensities), (B) they are usable only within a narrow spectral range (additional excitation/emission combinations generally require additional dyes), (C) they are costly, and (D) they are mechanically, thermally, or chemically unstable, and can age or dry out, which results in a change in the fluorescence intensity. Mineral standards (e.g., uranium glass) are generally considered to be preferable to dyes in that they are chemically stable. Nevertheless, some mineral standards may suffer from poor uniformity in their bulk material and they can be fragile (e.g., uranium glass is easily broken).

SUMMARY

Disclosed herein is a solid fluorescence standard that can be used to calibrate and/or normalize a device (e.g., a scientific instrument) that is configured for generating and collecting fluorescence data. The solid fluorescence standard has long term stability, the fluorescent material included in the fluorescence standard is chemically stable and not readily subject to photobleaching, and is applicable to a broad spectral range. In addition, the solid fluorescence standard is readily prepared so that it is uniform from standard-to-standard and across multi-well formats and the standard is physically robust.

In an embodiment, a fluorescence standard is disclosed. The fluorescence standard includes an adhesive (i.e., a material that can be used to prepare the fluorescence standard in a liquid medium, gel medium, or the like that can be allowed to cure to form a solid matrix), and a selected quantity of substantially non-photobleaching fluorescent particles (e.g., quantum dots) dispersed in the adhesive. In one embodiment, the adhesive may be a low viscosity, substantially optically transparent, solvent-free, radiation curable adhesive (e.g., a UV curable adhesive). In practice, the adhesive and the substantially non-photobleaching fluorescent particles are mixed together and disposed in a sample well. The adhesive is cured and solidified after being disposed in the sample well, which yields a solid fluorescence standard in the well.

In another embodiment, a multi-well fluorescence standard is disclosed. The multi-well fluorescence standard includes an adhesive (e.g., a low viscosity, substantially optically transparent, solvent-free, radiation curable adhesive), a selected quantity of substantially non-photobleaching fluorescent particles dispersed in the adhesive, and a multi-well format plate having a plurality of sample wells, wherein at least one sample well of the multi-well format plate has a selected quantity of the adhesive and the substantially non-photobleaching fluorescent particles disposed therein. As in the previous example, the adhesive is cured and solidified after being disposed in the at least one sample well. In one embodiment, the multi-well format plate is a 96-well plate. In another embodiment, the multi-well format plate comprises second stage of a self-contained biological analysis known as a pouch for the FilmArray® system (BioFire Diagnostics, Salt Lake City, Utah).

In yet another embodiment, an apparatus is described. The apparatus includes a thermocycling system comprising a sample block configured to receive a multi-well format plate, an optical system comprising an optical excitation system and an optical observation system, wherein the optical system is positioned in the apparatus for illumination and observation of contents of a multi-well format plate inserted in the sample block, and a multi-well format plate having a plurality of sample wells, wherein at least one sample well of the multi-well format plate has a solid fluorescence standard disposed therein. The solid fluorescence standard includes a substantially optically transparent, solvent-free, radiation curable adhesive, and a selected quantity of substantially non-photobleaching fluorescent particles dispersed in the adhesive. The adhesive is cured after being disposed in the at least one sample well.

In yet another embodiment, a method of calibrating an apparatus is disclosed. The method includes placing a sample container (e.g., a sample cuvette, a reaction tube, or a multi-well format plate) into the apparatus comprising a sample holder configured to receive the sample container, wherein the sample container has a solid fluorescence standard disposed therein. In one embodiment, the fluorescence standard includes an adhesive (e.g., a substantially optically transparent, solvent-free, radiation curable adhesive) and a selected quantity of substantially non-photobleaching fluorescent particles dispersed in the adhesive; the adhesive is cured after being disposed in the at least one sample well.

The method of calibrating further includes illuminating the sample container having the fluorescence standard therein using an optical system, measuring fluorescent emissions from the multi-well format plate, and adjusting a feature of the optical system based on a fluorescent signal of the optical system. In one embodiment, the feature of the optical system is one or more of alignment of an excitation light source or light intensity of an excitation light source.

In yet another embodiment, a fluorescence standard is disclosed. The fluorescence standard includes an adhesive (e.g., a low viscosity, substantially optically transparent, solvent-free, radiation curable adhesive), a selected quantity of substantially non-photobleaching fluorescent particles dispersed in the adhesive, and a sheet comprised of the adhesive and the fluorescent particles. In one embodiment, the adhesive having the substantially non-photobleaching fluorescent particles dispersed therein is cured and solidified after being disposed in a sheet. In another embodiment, the adhesive having the substantially non-photobleaching fluorescent particles dispersed therein is cured so as to form a sheet. In one embodiment, the sheet is trimmable to fit an instrument in need of calibration.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
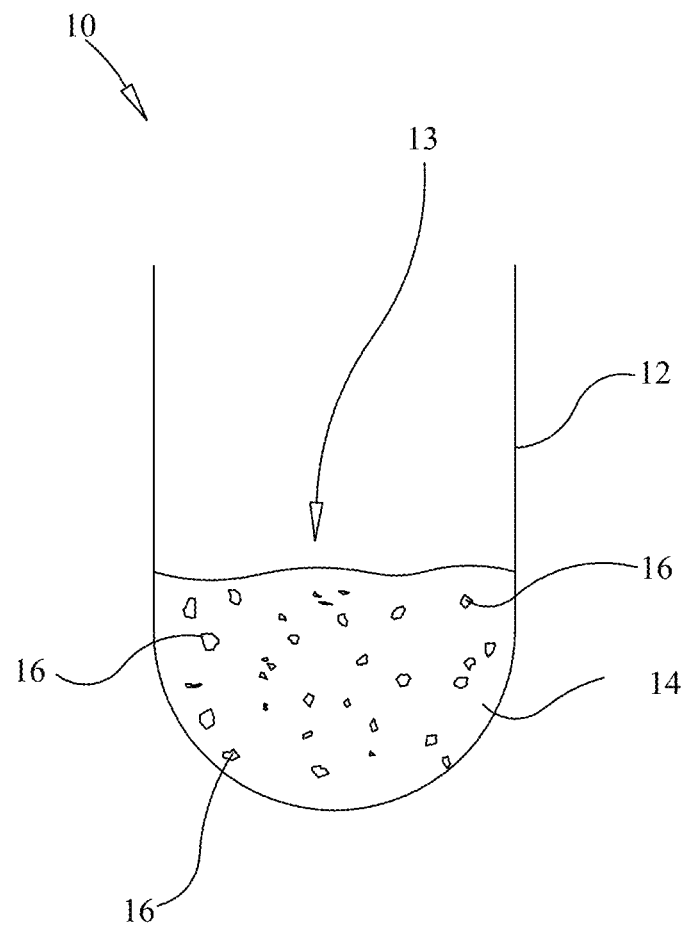
FIG. 1 illustrates a solid fluorescence standard, according to one embodiment of the present invention.

Disclosed herein is a solid fluorescence standard that can be used to calibrate and/or normalize a device (e.g., a scientific instrument) that is configured for generating and collecting fluorescence data. The solid fluorescence standard has long term stability, the fluorescent material included in the fluorescence standard is chemically stable and not readily subject to photobleaching, and is applicable to a broad spectral range. In addition, the solid fluorescence standard is readily prepared so that it is uniform from standard-to-standard and across multi-well formats and the standard is physically robust.

Various parts, components, subassemblies, and methods are described herein. While many of these parts, components, and subassemblies are described with reference to specific figures and specific embodiments, it is contemplated that various parts, components, subassemblies, and methods described herein are interchangeable and may be used with other parts, components, subassemblies, and methods or with other instruments. All compatible combinations are contemplated herein.

In one embodiment the fluorescence standard disclosed herein includes an adhesive, illustratively an optically clear adhesive and a selected quantity of fluorescent particles (e.g., quantum dots) dispersed in the adhesive. In one embodiment, the adhesive may be a low viscosity, substantially optically transparent, solvent-free, radiation curable adhesive (e.g., a UV curable adhesive). In practice, the adhesive and the fluorescent particles are mixed together and disposed in a sample well. The adhesive is cured and solidified after being disposed in the sample well, which yields a solid fluorescence standard in the well. In one embodiment, the adhesive/florescent particle mixture may be degassed under vacuum prior to disposing the mixture in the sample well and/or prior to curing to prevent bubble formation in the fluorescence standard.

Because the cured adhesive is solid and may not include volatile components, the volume of the adhesive does not substantially change over time and, as a result, the concentration of the fluorescently active crystalline material (e.g., quantum dots) does not substantially change over time. This means that once the standard is made, it can be used over and over again for a period of weeks, months, or even up to years. This can save significant time for instrument users because they do not need to make a new standard every time an instrument needs to be calibrated. Likewise, because the standard is stable over the long term, once the standard is made it can be used to calibrate an instrument or multiple instruments over a period of weeks, months, or even up to years. Similarly, because the standard can be used over and over again and the response of the standard is stable, data from an instrument or from more than one instrument that is collected on different days, weeks, or even in different years can be compared and normalized.

In addition, the fluorescent particles are not substantially susceptible to chemical breakdown or photobleaching, so the fluorescent particles provide a stable fluorescent signal over time. At a given excitation wavelength and intensity, the fluorescent signal from the fluorescent particles should be substantially stable and substantially the same over time. For instance, fluorescence from the fluorescent particles should not decrease by more than about 0.01%, 0.1%, 1%, 2%, 5%, or 10% over a period of time of at least six-months. This is in marked contrast to chemical dyes that are susceptible to both chemical breakdown and photobleaching. It is also notable that fluorescent particles (e.g., quantum dots) are available that absorb and emit in an almost infinite range of within the UV, visible, and IR spectra. As a result, individual particle types and mixtures of fluorescent particles can be selected to make fluorescence standards that absorb and emit any selected wavelength in order to test different excitation and emission combinations.

In addition, the fluorescent particles may be very small (e.g., 1-10 nm in diameter) and, as a result, they disperse readily and remain evenly suspended in the adhesive—e.g., the fluorescent particles may be small enough that they form a colloidal suspension. As a result, the fluorescence from the standard is typically highly uniform within a given standard and across multiple standards made from a given mixture of adhesive and fluorescent particles. Furthermore, because the illustrative adhesive has a low viscosity, a selected volume of the adhesive containing the fluorescent particles can be reproducibly pipetted into multiple wells (e.g., in a multi-well format plate) if many individual standards are being made. Likewise, because of the low viscosity, the illustrative adhesive does not tend to cling to or crawl up the sides of the sample well when pipetting. For instance, it can cause aberrant and/or inconsistent fluorescence readings if the adhesive streaks up the sides of the sample well. This can generally be avoided with use of a low viscosity adhesive.

The foregoing advantages of the fluorescence standard described herein represent a significant advance over the prior art.

Referring now to FIG. 1, an embodiment of a fluorescence standard 10 is illustrated. The fluorescence standard 10 includes a sample well 12 with fluorescent material 13 disposed therein. The sample well can be any sample container known in the art, such as, but not limited to, a test tube, an Eppendorf tube, a PCR reaction tube, a cuvette, and the like. In one embodiment, the sample well 12 is an individual sample well. In another embodiment, the sample well 12 may be part of a multi-well format plate (e.g., a 96-well plate) or multi-well format strip (e.g., an eight well strip). As used herein, the term "sample well" can refer to any vessel, cuvette, tube, etc. used to contain a sample, a reaction mixture, or the like. In addition to multi-well plate formats, tubes, pouches, and other formats may be appropriate, as is suitable for the instrument in need of calibration. It is also understood that other configurations of calibrator materials may be used that take the place of the sample well. For example, a solid plate of the fluorescent material may be used instead of a plate of discrete wells containing the fluorescent material. Similarly, the fluorescent material may be provided as a sheet, wherein the sheet may take the place of a plate for calibrating the instrument, or may be provided disposed on a trimmable material that can be trimmed to size prior to use.

The fluorescent material 13 of the fluorescence standard 10 includes an adhesive 14 (e.g., a low viscosity, substantially optically transparent, solvent-free, radiation curable adhesive), and a selected quantity of fluorescent particles 16 dispersed in the adhesive 14. The adhesive 14 and the fluorescent particles 16 are mixed and then the adhesive 14 is cured in the sample well 12. The illustrated embodiment schematically shows the fluorescent particles 16 evenly dispersed in the adhesive 14. Preferably, the fluorescent particles 16 are evenly dispersed in the adhesive 14 before and after curing.

In a preferred embodiment, the fluorescent particles 16 are quantum dots. The terms "quantum dot" or "quantum dots" (QDs) refer to fluorescently active semi-conductor or metallic crystals with various shapes (dots, rods, fibers, tetrapods and other geometries) and sizes ranging from about 1 to 100 nm. Small quantum dots, such as colloidal semiconductor nanocrystals, can be as small as 1 to 10 nanometers, corresponding to 10 to 50 atoms in diameter and a total of 100 to 100,000 atoms within the quantum dot volume. Self-assembled quantum dots are typically between 10 and 50 nm in size. One characteristic of QDs is that they fluoresce by confining excitons in all three spatial dimensions by a process called quantum confinement. As a result, the optical and electronic properties of quantum dots are dependent on particle size and shape and can therefore be controlled over a large range. The larger the QD, the redder (lower energy) its fluorescence spectrum. Conversely, smaller QDs emit bluer (higher energy) light. Quantitatively speaking, the bandgap energy that determines the energy (and hence color) of the fluorescent light is inversely proportional to the size of the QD. Larger QDs have more energy levels, which are also more closely spaced. Evidence also suggests that the shape of the QD may be a factor in the coloration as well.

In some embodiments, QDs are considered to be superior (e.g., for use as dyes in biological labeling and imaging) when compared to conventional molecular dyes. One of the most immediately obvious being the brightness of QDs owing to their high extinction coefficient combined with a quantum yield comparable to fluorescent dyes. In addition, quantum dots are much less susceptible to photobleaching as compared to chemical dyes. It has been estimated that the illustrative quantum dots are 20 times brighter and 100 times more stable than traditional fluorescent dyes.

Quantum dots can be made of a number of materials. Cadmium selenide and lead selenide QDs are generally the most common types. Other types of QDs include cadmium chalcogenides, lead chalcogenides, zinc chalcogenide, and mercury chalcogenides. A "chalcogenide" is a chemical compound that includes at least one chalcogen anion and at least one more electropositive element. Although all 16 elements of the periodic table are defined as chalcogens, the term chalcogenide is more commonly used for sulfides, selenides, and tellurides, rather than oxides. Metallic phosphides, nitride, and arsenides are also common among QD types.

QDs can be surface stabilized with a number of surface stabilizing ligands. Surface-stabilizing ligands include, but are not limited to, alkyl carboxylic acids, alkyl amines, alkyl phosphines, and alkyl sulfides. QDs can also be stabilized by growing shell around the QD core. Zinc sulfate is a common shell material.

Commercially available QDs include, but are not limited to, CdSe, CdS, CdTe, PbS, PbSe, and CdSe/ZnS (a CdSe core and a ZnS shell). Because Cd and Pb are toxic heavy metals and are restricted in a number of applications, there is desire for heavy metal-free QDs. Indium phosphide (InP) is an example of a commercially available, heavy metal-free QD. InP QDs are available with and without a ZnS shell. For a given size, each QD type will have slightly different emission properties depending on the electronic properties of the material(s) used to make the QDs.

In another embodiment, the fluorescent particles 16 may include ground particles of a fluorescent glass. Many naturally occurring glasses (e.g., rubies and sapphires) and doped glasses (e.g., glasses doped with elements such as, but not limited to, U, Mn, Eu(II), Co, Eu(III), V, Tb, Sn, Ce, and Cu) fluoresce under certain wavelengths of light (i.e., UV and visible light). Such materials can be ground into fine particles (e.g., 10 nm-10 µm) and combined with a selected adhesive to make the fluorescence standard described herein. Depending on the selection of the naturally occurring glass or the dopant in the doped glass, such glasses can be selected to absorb and emit at a variety of selected UV and visible wavelengths.

In another embodiment, the fluorescent particles 16 are ground particles of a fluorescent plastic. Many plastics (e.g., acrylics) fluoresce under certain wavelengths of light (i.e., UV and visible light). Such materials can be ground into fine particles (e.g., 10 nm-10 µm) and combined with a selected adhesive to make the fluorescence standard described herein. Depending on the selection of the fluorescent plastic, such plastics can be selected to absorb and emit at a variety of selected UV and visible wavelengths. Plastics (e.g., polystyrene microspheres) can also be doped or impregnated with materials such as, but not limited to, chemical dyes and metal chelates (e.g., europium(II) and europium(III) chelates), that can produce a wide variety of colors under UV and visible light. Such doped or impregnated materials may be considered to be superior to chemical dyes because the fluors are isolated from the bulk chemistry of their environment and the chemistry of the plastic (e.g., the plastic sphere) can be selected to be compatible with a variety of aqueous, organic, polar, and non-polar environments.

As used herein, the term "adhesive" refers to materials that allow the fluorescent particles to be suspended in a liquid medium that can be cured to form a solid, plastic-like matrix. Suitable adhesives include, but are not limited to, single and two component adhesives including silicone, polyester, epoxy, and urethane based adhesives. In a preferred embodiment, the adhesive is optically clear and transparent, meaning that such adhesives may transmit at least 95%, 97%, 99%, or up 100% of light in the visible light spectrum. Likewise, in a preferred embodiment, suitable adhesives have a low intrinsic fluorescence. Fluorescence of the adhesive is wavelength dependent insofar as an adhesive may absorb and reemit at some wavelengths but not others. However, it is preferable that the adhesive contribute a low and predictable amount of fluorescence to the total fluorescence signal observed from the combination of adhesive and fluorescent particles that are combined to make the fluorescence standard described herein. For example, at a selected wavelength, the adhesive may contribute less than 50%, less than 45%, less than 40%, less than 35%, less than 30%, less than 25%, less than 20%, less than 15%, less than 10%, less than 9%, less than 8%, less than 7%, less than 6%, less than 5%, less than 4%, less than 3%, less than 2%, less than 1%, less than 0.5%, less than 0.1%, or less than 0.01% of the total observed fluorescence of the fluorescence standard.

In one embodiment of the fluorescence standard, the adhesive 14 may be a low viscosity, substantially optically transparent, solvent-free, radiation curable adhesive. In one embodiment, such an adhesive may be a UV curable adhesive. Many optically transparent, solvent-free UV curable adhesives are known in the art as they are commonly used in the manufacture of optical devices, such as the compound lenses used in camera lenses, telescopes, and the like. Such adhesives are typically optically clear and transparent (e.g., they may transmit at least 95%, 97%, 99%, or up 100% of light in the visible light spectrum). In a preferred embodiment, the low viscosity, substantially optically transparent, solvent-free, radiation curable adhesive is a low fluorescence adhesive. That is, the adhesive has a low intrinsic fluorescence.

In addition to their desirable optical properties, such liquid adhesives may also have a low volatility due to the fact that up to 100% of the volume of the adhesive may be made up of curable moieties. Likewise, such adhesives may have very low shrinkage upon curing and their volume does not change over time due to the absence of volatile solvent components. Low volatility and low shrinkage can increase the stability of the fluorescence standard described herein because the volume and chemical makeup of the adhesive matrix does not substantially change over time.

As described herein, the adhesive 14 used in the fluorescence standard 10 is a low viscosity adhesive. In one embodiment, the adhesive has a viscosity of about 10-100 centipoise at about 15-25° C. Preferably, the adhesive has a viscosity of 12-30 centipoise at 15-25° C. Even more preferably, the adhesive has a viscosity of about 15-25 centipoise at 15-25° C. Adhesives in this range of viscosities (e.g., 10-100 centipoise, 12-30 centipoise, or 15-25 centipoise) are relatively thin and can be easily mixed with quantum dots and can be reproducibly pipetted. By comparison, water has a viscosity of 1 centipoise at room temperature, apple juice concentrate at room temperature has a viscosity of about 30 centipoise, and common vegetable oils (soybean oil, corn oil, and cottonseed oil) have room temperature viscosities ranging from about 30-80 centipoise.

In a specific embodiment, the adhesive is Norland Optical Adhesive NOA 89 (Norland Products Company, Cranbury, N.J.). NOA 89 is a clear, colorless, liquid photopolymer that will cure when exposed to ultraviolet light and or visible light (blue-violet). Since it is a one-part system and 100% solids, it offers low volatility and low shrinkage. It is understood that other adhesives, particularly optically clear, transparent, and low fluorescence adhesives, may be used. In addition to the specific adhesive described above, the Norland Products Company is a supplier of many substantially optically transparent adhesives that may be suitable for use in preparation of the fluorescence standard described herein.

In one embodiment of the fluorescence standard 10, the fluorescent particles 16 (e.g., quantum dots) are included in the adhesive 14 at a concentration adapted for providing a defined emission intensity at a selected wavelength and excitation intensity. In one embodiment, quantum dots may be included in the adhesive at a concentration of about 0.01 µg/ml to about 10 µg/ml, preferably at a concentration of about 0.05 µg/ml to about 1 µg/ml, or more preferably at a concentration of about 0.075 µg/ml to about 0.2 µg/ml. In one embodiment, the quantum dots may be included in the adhesive at a low end concentration of about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.35, 0.4, 0.45, or 0.5 µg/ml, an upper end concentration of about 10, 9.5, 9, 8.5, 8, 7.5, 7, 6.5, 6, 5.5, 5, 4.5, 4, 3.5, 3, 2.5, 2, 1.5, 1, 0.9, 0.8, 0.7, 0.6, or 0.55 µg/ml, or any combination of the foregoing upper and lower numbers or any concentration therebetween.

While the foregoing is intended to provide a numerical framework for understanding a concentration adapted for providing a defined emission intensity at a selected wavelength and excitation intensity, one will appreciate that because the quality and intensity of quantum dots may vary from supplier to supplier, and instruments may have different excitation and detection efficiencies, the concentration of QDs needed to provide a defined emission intensity at a selected wavelength and excitation intensity may vary depending on the application.

In one embodiment, the fluorescent particles (e.g., quantum dots) that are included in the fluorescence standard absorb and emit light in the range of about 350 nm to 850 nm. This represents a range from the soft UV (350 nm) to short wavelength IR (850 nm). Such a range is readily accessible with standard QDs.

In one embodiment, the fluorescent particles included in the fluorescence standard 10 include at least a first quantum dot having a green color. In another embodiment, the fluorescent particles included in the fluorescence standard 10 include at least a second quantum dot having a red color.

In one embodiment, the fluorescent particles included in the fluorescence standard 10 include at least a first quantum dot that absorbs in a range of about 450 nm to about 550 nm and that emits in a range of about 500 nm to 630 nm. In another embodiment, the fluorescent particles included in the fluorescence standard 10 include at least a second quantum dot that absorbs in a range of about 550 nm to about 650 nm and that emits in a range of about 630 nm to 720 nm.

Figure 2A:
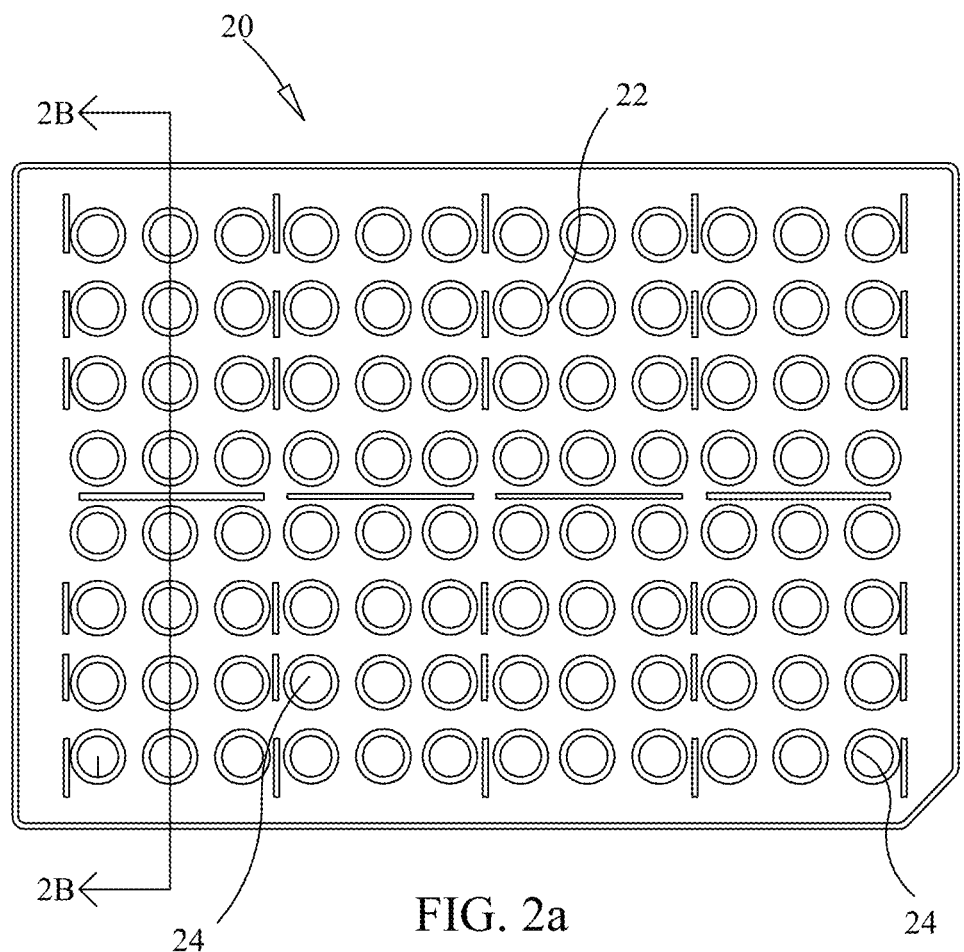
FIG. 2A illustrates a multi-well format plate (e.g., a 96-well plate) with a solid fluorescence standard in each well.
Figure 2B:
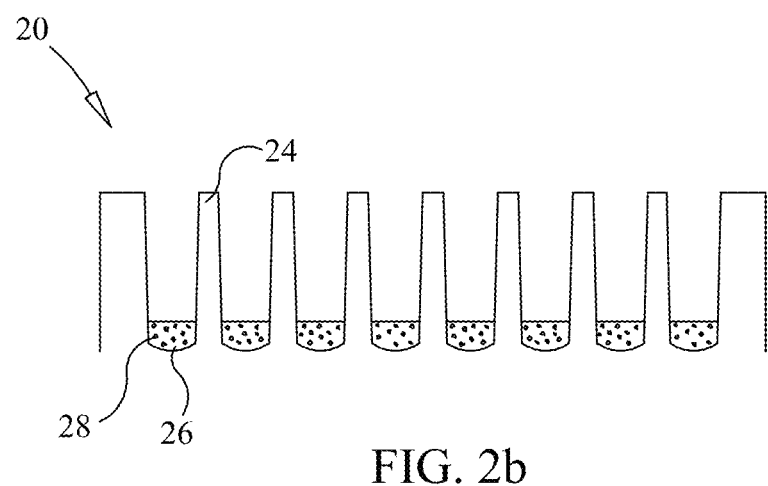
FIG. 2B illustrates a side cutaway view of the multi-well format plate of FIG. 2A.
Figure 3:
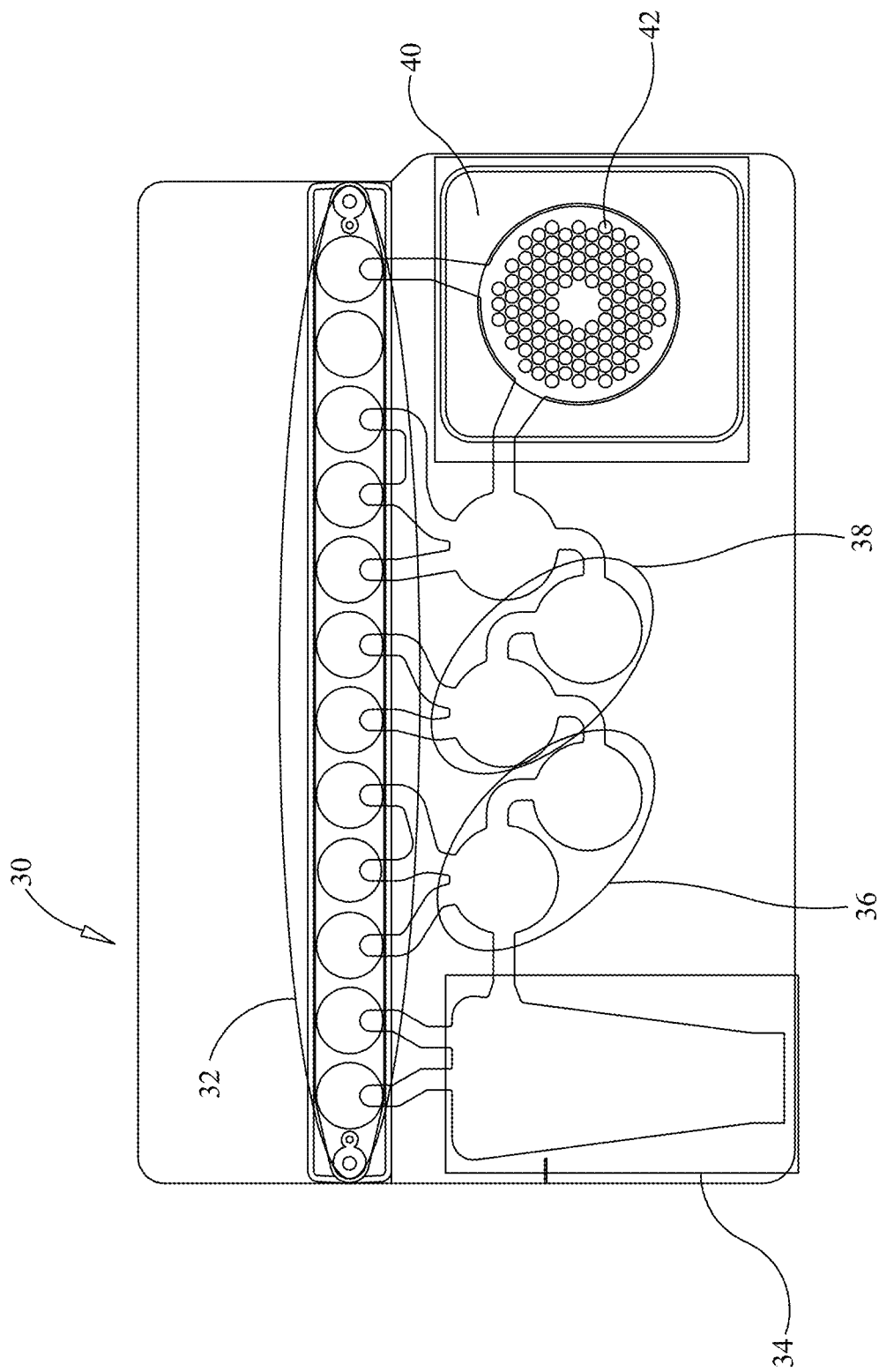
FIG. 3 illustrates a FilmArray pouch multi-well format second stage.

Referring now to FIGS. 2A-3, multi-well fluorescence standards are illustrated. In one embodiment, a multi-well fluorescence standard includes an adhesive (e.g., a low viscosity, substantially optically transparent, solvent-free, radiation curable adhesive), a selected quantity of fluorescent particles (e.g., quantum dots) dispersed in the adhesive, and a multi-well format plate having a plurality of sample wells. In the multi-well plate, at least one sample has a selected quantity of the adhesive and the quantum dots disposed therein. The adhesive is cured and solidified after being disposed in the at least one sample well.

Referring to the embodiment of FIG. 2A, the multi-well format plate is a 96-well plate 20. In the 96-well plate 20, at least one of the wells 24 includes the combination of the adhesive and the fluorescent particles. In one embodiment, the 96-well plate 20 may have only one well that includes the fluorescence standard. In another embodiment, all 96-wells may include the fluorescence standard. In yet another embodiment, only a selected subset of wells (e.g., the wells in circle 22) may include the fluorescence standard.

Referring to FIG. 2B, which illustrates a cutaway view of the wells 24 of the 96-well plate 20 of FIG. 2A along line 2B. Each well 24 includes a selected quantity of adhesive 26 and fluorescent particles 28. The fluorescent particles 28 included in the sample wells 24 may be of one type (e.g., one color) or they may be of multiple types (e.g., at least two colors), and each of the sample wells 24 may have the same type or types of fluorescent particles 28 or certain sample wells may have other types of fluorescent particles 28. In one embodiment, each well includes about 1-100 μl (e.g., 5-10 μl) of the combined adhesive 26 and fluorescent particles 28. However, the volume of the adhesive 26 and fluorescent particles 28 may vary depending on the application and the size of the well in the 96-well plate.

Referring now to FIG. 3, another example of a multi-well format analysis plate is illustrated. The multi-well format analysis plate is part of a self-contained analysis array referred to as a pouch 30. The pouch 30 includes a plurality of reagent reservoirs 32, a cell lysis zone 34, a nucleic acid purification zone 36, a first PCR zone 38, and a second PCR zone 40. Samples suspected of containing an unknown microbe (e.g., a pathogen) are injected into the pouch 30 via ports of the plurality of reagent reservoirs 32, and reagents for preparing the samples are added via other ports of the plurality of reagent reservoirs 32. The samples are automatically prepared and subjected to PCR amplification in the FilmArray instrument. In the second-stage PCR zone 40, the prepared cell lysate is subjected to PCR cycling and possible amplification in the second-stage PCR zone 40 that are unique to a selected panel of microbes (e.g., possible pathogens). Each of the wells 42 in the second-stage PCR zone 40 have a set of primers that can amplify DNA that is unique to one microbe of the panel of microbes. If the unknown microbe from the sample is in the panel, the primers in one or more wells 42 will amplify DNA from that microbe and the amplification can be detected fluorescently.

Additional discussion of the FilmArray system, how it operates, and how it is used can be found in U.S. Pat. Nos. 8,394,608, 8,940,526, and 9,102,911 and U.S. Pat. Pub. No. 2015/0099291, the entireties of which are incorporated herein by reference.

Because the amplification products in the FilmArray system are detected fluorescently, it is desirable to have standards for calibration of the fluorescent excitation and detection systems. In one embodiment, a standard can be made by filling the wells 42 of the second-stage PCR zone 40 with a quantity of adhesive 26 and fluorescent particles 28. The wells 42 of the second PCR zone may be filled such that each well includes substantially the same volume of the adhesive and substantially the same amount of fluorescent particles. However, other configurations are possible.

Referring again to FIG. 2A, circle 22 represents the center of the multi-well plate. Many fluorescent instruments include a single lamp or light source, beam spreaders, and filters for excitation of fluorescence. The desire is to spread the light evenly, but practically speaking, if the light source is aligned properly the wells in the center of the plate will be illuminated more intensely than the wells on the periphery. As such, the fluorescence standard described herein can be used for checking the alignment of the light source and, if necessary, for adjusting the alignment of the light source. In one embodiment, each well of the multi-well format plate may be adapted for providing substantially the same emission intensity at a selected wavelength and excitation intensity. That is, each of the wells in the multi-well format plate may be provided with substantially the same volume, substantially the same amount, and substantially the same type of fluorescent particles. In other embodiments, one or more selected wells of the multi-well format plate may be adapted for providing different emission intensities at a selected wavelength and excitation intensity.

The fluorescence standard described herein can be used in a variety of fluorescence instruments known in the art. In a preferred embodiment, the fluorescence standard described herein is configured for use in a PCR instrument designed for real-time fluorescent monitoring of PCR amplification and melting. Accordingly, one embodiment of the present disclosure includes an apparatus that includes a thermocycling system comprising a sample block configured to receive a multi-well format plate, an optical system comprising an optical illumination system and an optical observation system, wherein the optical system is positioned in the apparatus for illumination and observation of contents of a multi-well format plate (e.g., a 96-well plate) inserted in the sample block, and a multi-well format plate having a plurality of sample wells, wherein at least one sample well of the multi-well format plate has a solid fluorescence standard disposed therein.

The fluorescence standard includes an adhesive (e.g., a substantially optically transparent, solvent-free, radiation curable adhesive), a selected quantity of fluorescent particles (e.g., quantum dots) dispersed in the adhesive. The adhesive is cured after being disposed in the at least one sample well. In one embodiment, the fluorescence standard is included in each of the wells of the 96-well plate.

Figure 9:
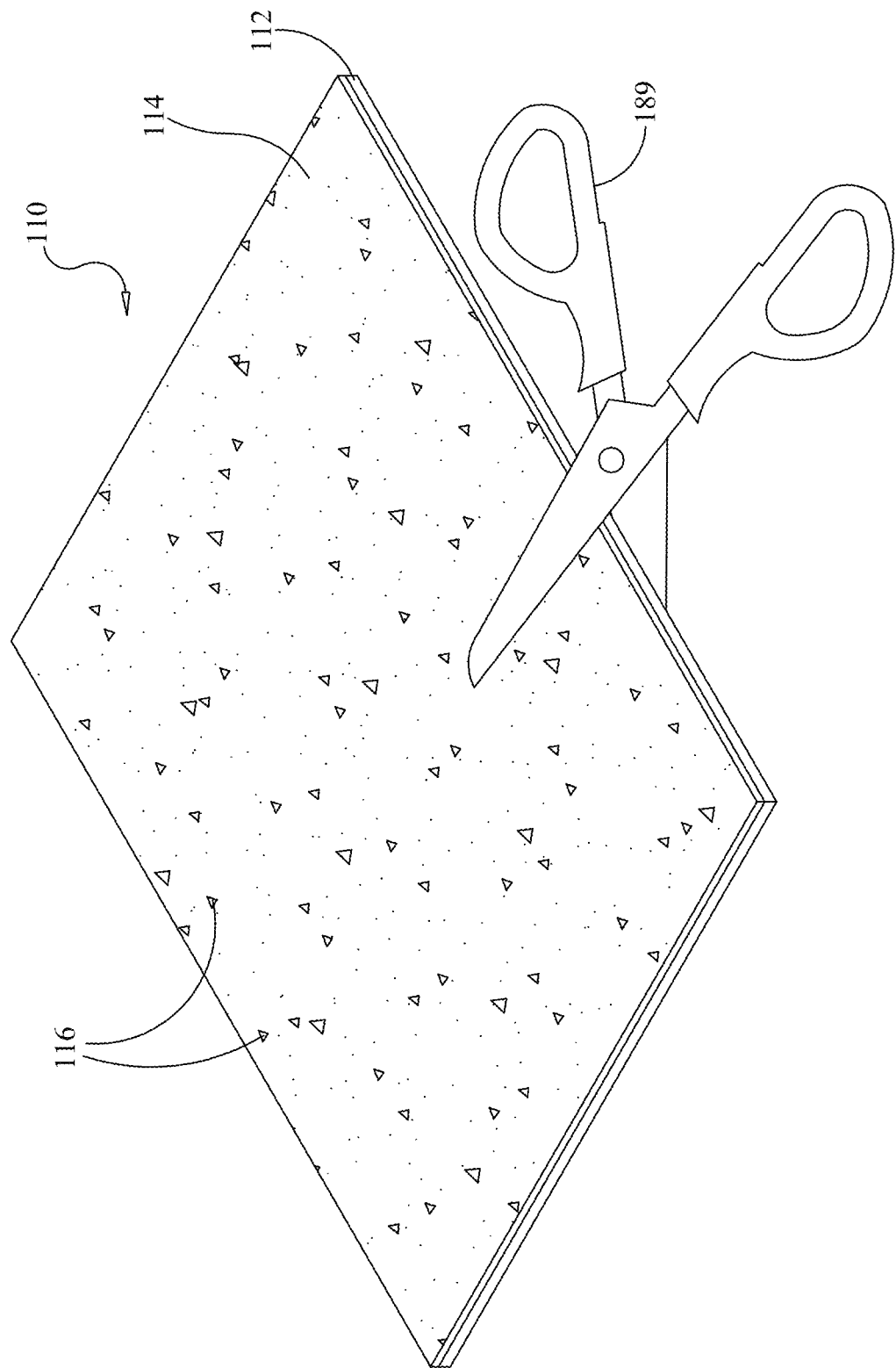
FIG. 9 illustrates a trimmable sheet for calibrating an instrument.

FIG. 9 shows an alternate embodiment of a fluorescent standard 110. In this embodiment, the multi-well plate format is in a sheet format that includes a support material 112. The support material may be a substantially optically transparent flexible or semi-flexible sheet, illustratively plastic or other material that is easily cut or trimmed. Provided upon the support material 112 is an adhesive 114 (e.g., a substantially optically transparent, solvent-free, radiation curable adhesive), and a selected quantity of fluorescent particles 116 dispersed in the adhesive 114. The adhesive 114 and the fluorescent particles 116 may be similar to adhesive 14 and particles 16, discussed above. The adhesive 114 and particles 116 are mixed and then the adhesive 114 is cured on the support material 112. In this embodiment, the sheet may be a specific size or may be trimmed to size, illustratively to fit variously sized instruments, or may be trimmed as needed for calibration of a specific instrument. Scissors 189, a knife, or other cutting tool may be used to trim fluorescent standard 110. In an alternative embodiment (not shown), an adhesive may be selected with properties that allow the support material to be dispensed with, illustratively by curing on a layer from which the adhesive layer may be peeled. Such a fluorescent standard would include a flexible or semi-flexible sheet fabricated from the adhesive, and a selected quantity of fluorescent particles dispersed in the adhesive.

In one embodiment, the fluorescent particles (e.g., quantum dots) that are included in the fluorescence standard 110 absorb and emit light in the range of about 350 nm to 850 nm. This represents a range from the soft UV (350 nm) to short wavelength IR (850 nm). Such a range is readily accessible with standard QDs.

In one embodiment, the fluorescent particles included in the fluorescence standard (see, e.g., standard 10 or standard 110) may include at least a first quantum dot having a green color. In another embodiment, the fluorescent particles included in the fluorescence standard (see, e.g., standard 10 or standard 110) may include at least a second quantum dot having a red color. However, it is understood that any dye colors for fluorescent detection may be used. Illustratively, quantum dots having colors similar to FAM, HEX, ROX, Cy5, VIC, JOE, or other commonly used fluorophores may be used, corresponding to green, yellow, orange, red, purple, and blue.

In one illustrative embodiment, a mixture of quantum dots may be used to match the emissions spectrum of a particular fluorophore. In one non-limiting example, an instrument may be used primarily with FAM, and the quantum dots may be used in a color ratio to substantially match the emissions spectrum of FAM. In one such illustrative example, the emission spectra of an organic fluorescent dye can be approximated using a linear combination of different quantum dots where an optimal concentration for the quantum dots can be determined by using an ordinary least squares method to provide a solution to an over-determined set of equations. Illustratively, for the over-determined system:

$$Y = AX$$

Solving for X using the least squares method:

$$X = (A^T A)^{-1} A^T Y$$

wherein:
T indicates a matrix transpose,
X is a vector solution, representing the optical concentration for each of the quantum dot dyes,
Y is a vector of the spectra of the organic dye that is to be approximated, and
A is a matrix comprised of the basis vectors for each of the quantum dot dyes. The spectra of each of the quantum dots may be arranged vertically to form the matrix.

A given solution to the above system—i.e., the specific mixture of quantum dots needed to mimic the emission spectrum of a selected dye—may vary depending on a number of factors including, but not limited to, quantum dot quality and age (depending on actual age and storage conditions). For instance, because a given solution to the above system is a function of the emission spectra of the QDs mixed to mimic the dye and because the emission spectrum of a population of QDs is a function of the size distribution of the QDs in the lot, the solution to the system may vary depending on the QD supplier and the quality of the QDs obtained from a seller. Thus, while the above system describes the process for finding a mixture of QDs needed to mimic the emission spectrum for a given dye, the process may, for instance, need to be repeated when new lots of QDs are purchased, when suppliers are changed, or as previously purchased QDs age.

In one embodiment, the fluorescent particles included in the fluorescence standard (see, e.g., standard 10 or standard 110) include at least a first quantum dot that absorbs in a range of about 450 nm to about 550 nm and that emits in a range of about 500 nm to 630 nm. In another embodiment, the fluorescent particles included in the fluorescence standard 10 include at least a second quantum dot that absorbs in a range of about 550 nm to about 650 nm and that emits in a range of about 630 nm to 720 nm.

Figure 4:
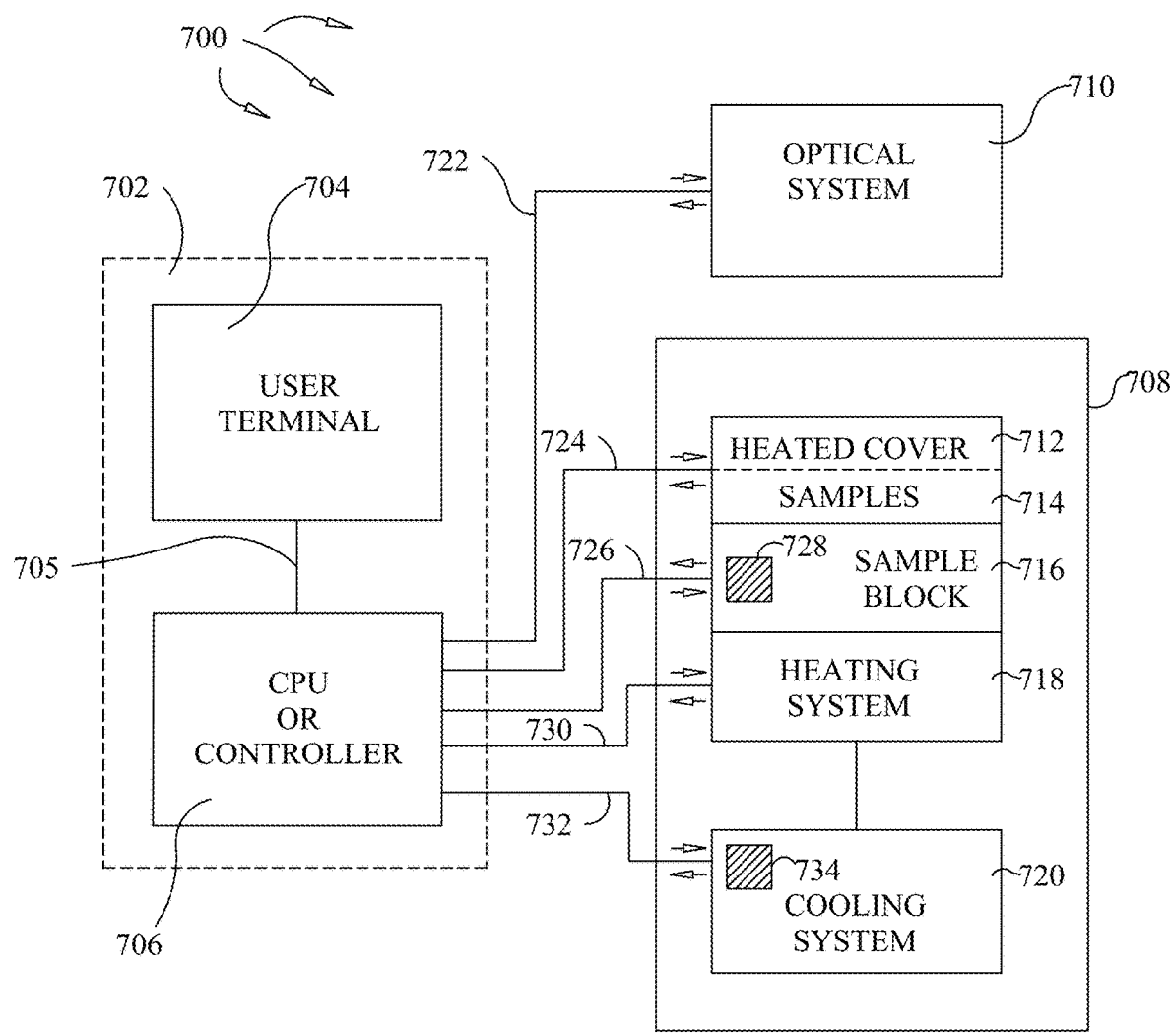
FIG. 4 is a block diagram of an exemplary embodiment of a thermal cycling system in accordance with aspects of the disclosure

Referring to FIG. 4, a block diagram of thermocycling apparatus 700 adapted for PCR and real-time fluorescent monitoring of samples is illustrated. The apparatus 700 includes control systems 702, a thermocycling system 708, and an optical system 710. The optical system 710 is operatively associated with the thermocycling system 708. In an embodiment, the optical system 710 includes a sample block (e.g., sample block 716). The sample block includes a top surface and a plurality of sample wells that are configured for receiving a multi-well format plate (e.g., a 96-well plate).

The optical system 710 may further include a camera and an excitation light source that are each in a fixed position in the optical path relative to the sample block. The sample block, the illumination light source, and the camera are positioned and arranged relative to one another such that the illumination light source can excite fluorescence in a plurality of samples or fluorescent standard(s) in the sample block and the camera can observe and record the fluorescent signal.

In one embodiment of the optical system 710, the illumination light source may further include one or more filters that can be used to select various excitation wavelengths for excitation of fluorescence form various dyes and quantum dots. For example, filters can be used to select excitation wavelengths selected from, but not limited to, 470, 530, 586, and 630 nm. Likewise, the camera may be equipped with filter wheel and filters that can be used to filter various fluorescent signals, illustratively at 510, 555, 620, 640, 665, and 710 nm. For example, the fluorescence standard described herein may include the use of multiple QDs that can fluoresce simultaneously. Many excitation and emission wavelengths can be selected from the standard for calibration and normalization of the instrument.

In one example, the illumination light source may include a multichromatic light source and the filters may be so-called dual band filters. For example, the illumination light source may include one or more lamps that are each equipped with several LEDs having at least two different colors, and focusing optics that are capable of focusing and spreading light from the LEDs so that they provide an output that is illustratively substantially gaussian. The dual band filters may each be equipped such that they can pass one emission band from the different LEDs. For example, a first filter may be capable of passing bands of light centered around 470 and 586 nm and a second filter may be capable of passing bands of light centered around 530 and 630 nm. Using such an illumination light source and filters, the optical system 710 may be configured to produce up to four different excitation wavelengths from only two lamps. In other embodiments, the filters may be, for example, triple band pass filters and the illumination light source may include, for example, two lamps that are each capable of producing three discrete light color ranges. Such a system may be configured to produce up to six different excitation wavelengths from only two lamps.

The apparatus 700 may further include a heating system 718 and cooling system 720 operatively coupled to the sample block 716, a control system 702 for operating, and operatively connected to, the heating system 718 and cooling system 720, and a temperature sensing system 728 and 734 configured for sensing the temperature in the sample block. The temperature sensing system 728 and 734 is operatively connected the heating and cooling system and the control system such that the temperature of a plurality of samples disposed in the sample block can be rapidly and controllably increased and decreased by the heating and cooling system in response to a temperature sensed by the temperature sensing system such that the plurality of samples can be subjected to rapid thermal cycling. In one embodiment, the control system 702 includes an external computing device that is operatively coupled to at least one of the thermocycling system 708, the optical system 710, the heating and cooling system 718 720, the control system 702, or the temperature sensing system 728, 734.

With further reference to FIG. 4, samples 714 (i.e., samples including nucleic acids to be amplified or fluorescent standards) may be placed in temperature-controlled sample block 716 and may be covered by a heated cover 712. Samples 714 can be held in a sample holder (e.g., in a multi-well well plate, tube strips, or individual sample tubes, etc.) configured to be seated in the sample block 716. The sample block 716 may be a metal block constructed, for example, from a thermally conductive metal such as copper or aluminum.

A user may supply data defining time and temperature parameters (e.g., time-temperature profiles) of the desired PCR protocol via a terminal 704. For example, the terminal 704 may include an external computing device that includes a keyboard, a display, and one or more control, memory, or programming modules that allow programming and control of thermocycling parameters, or may be integral to the apparatus. The user terminal 704 is coupled via a data bus 705 to a controller 706 (sometimes referred to as a central processing unit or CPU). The controller 706 can include memory that stores a desired control program, data defining a desired PCR protocol, and certain calibration constants. Based on the control program, the controller 706 may control temperature cycling of the sample block 716 and/or holders containing the samples 714 and implements a user interface that provides certain displays to the user and receives data entered by the user via the user terminal 704. Likewise, the controller 706 can include memory that stores a desired program for controlling or managing collection of fluorescence data from the sample via the optical system 710. Based on the control program, the controller 706 may control optical system parameters such as timing of optical data collection, wavelength data, and the like and implement a user interface that provides certain displays to the user and receives data entered by the user via the user terminal 704. It should be appreciated that the controller 706 and associated peripheral electronics to control the various heaters, optical systems 710, and other electro-mechanical systems of the thermal cycling system 708 and read various sensors can include any general purpose computer such as, for example, a suitably programmed personal computer or microcomputer.

The controller 706 can include appropriate electronics to sense the temperature of the heated cover 712 and control electric resistance heaters therein to maintain the cover 712 at a predetermined temperature. Sensing of the temperature of the heated cover 712 and control of the resistance heaters therein is accomplished via a temperature sensor (not shown) and a data bus 724.

A cooling system 720 can provide precise temperature control of the samples 714. According to some aspects, the cooling system 720 can be operated to achieve fast, efficient, and/or uniform temperature control of the samples 714. According to some aspects, the cooling system 720 can be operated to quickly and/or efficiently achieve a desired temperature gradient between various samples. The cooling system 720 may, for example, be configured to reduce the temperature of the samples 714 from a high temperature denaturation incubation to lower temperature annealing and extension incubation temperatures. For example, the cooling system 720 may lower the temperature of the sample block 716 or may act to directly lower the temperature of holders containing the samples 714.

A heating system 718 can be controlled by the controller 706 via a data bus 730 to rapidly raise the temperature of the sample block 716 and/or the sample holders to higher incubation temperatures from lower incubation temperatures. The heating system 718 also may correct temperature errors in the upward direction during temperature tracking and control during incubations.

The heating system 718 may include, but is not limited to, film heaters, resistive heaters, heated air, infrared heating, convective heating, inductive heating (e.g. coiled wire), peltier based thermoelectric heating, and other heating mechanisms known to those skilled in the art. According to various exemplary embodiments, the cooling system and the heating system may be a single system configured to both increase and decrease the temperature of the block 712 and/or of the sample holders directly.

In the exemplary embodiment of FIG. 4, the controller 706 controls the temperature of the sample block 716 by sensing the temperature of the sample block 716 via a temperature sensor 728 and the data bus 726 and by sensing the temperature of the cooling system 720 via bus 732 and a temperature sensor 734 in the cooling system 720. By way of example only, the temperature of the cooling system 720 may be sensed, although other temperatures associated with the cooling system may also be sensed.

The fluorescence standard discussed herein can be used to calibrate and normalize an instrument like that of the apparatus described in reference to FIG. 4. In addition, because the fluorescence of quantum dots are to some extent affected by temperature, the fluorescence standards described herein can be used to monitor the thermal dynamic response of an instrument. In a sample block with, for example, 96 wells it is possible for some of the sample wells to be drastically off in terms of their temperature response in cycling and in static temperature control. Monitoring thermal dynamic response would show which samples are overshooting or oscillating in temperature, but not by how much.

Further discussion of thermocycling systems that may be used in the devices and apparatuses disclosed herein can be found in PCT/US2011/063005 (published as WO 2012/075360), the entirety of which is incorporated herein by reference. Discussion of fluorescent monitoring of samples and, in particular, PCR samples can be found in U.S. Pat. No. 7,670,832, the entirety of which is incorporated herein by reference.

Reference to certain non-limiting examples will now be made.

Example 1

Figure 5:
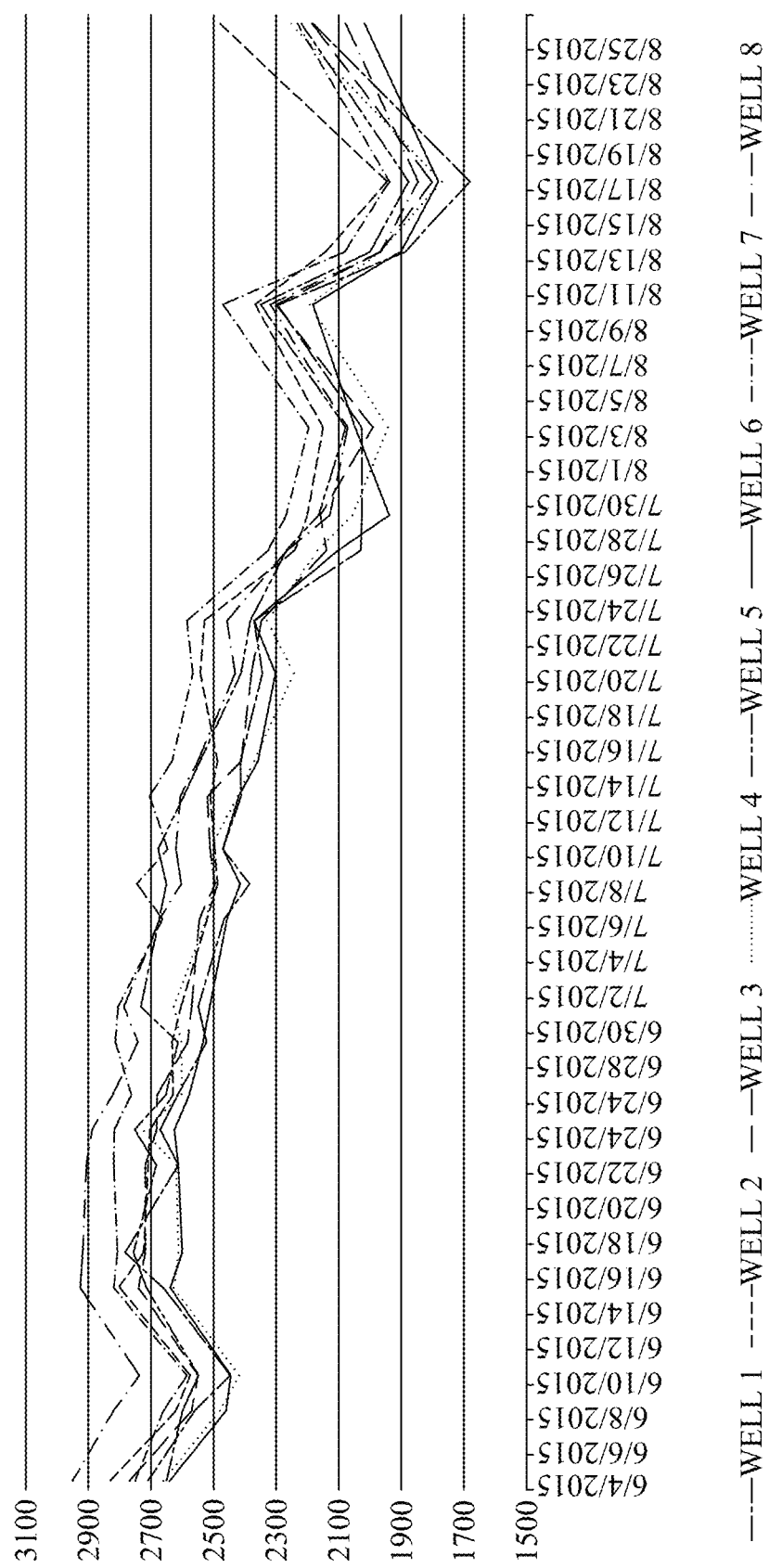
FIG. 5 illustrates data comparing the fluorescence response of several fluorescence standards over time.

Referring to FIG. 5, data is shown illustrating the stability of a fluorescence standard over an approximately three-month period. The fluorescence standard used to collect the FIG. 5 data included eight wells of a 96-well plate and the standard included QDs of a single color (i.e., green) embedded in the UV curable adhesive described herein. The data shows that the fluorescent standard was stable and usable over the three-month period of study. While there was some drop off in fluorescence response, this may have been because of an instrument calibration issue. The instrument was recalibrated and the fluorescent data returned to close to its original response thereafter.

Example 2

Figure 6:
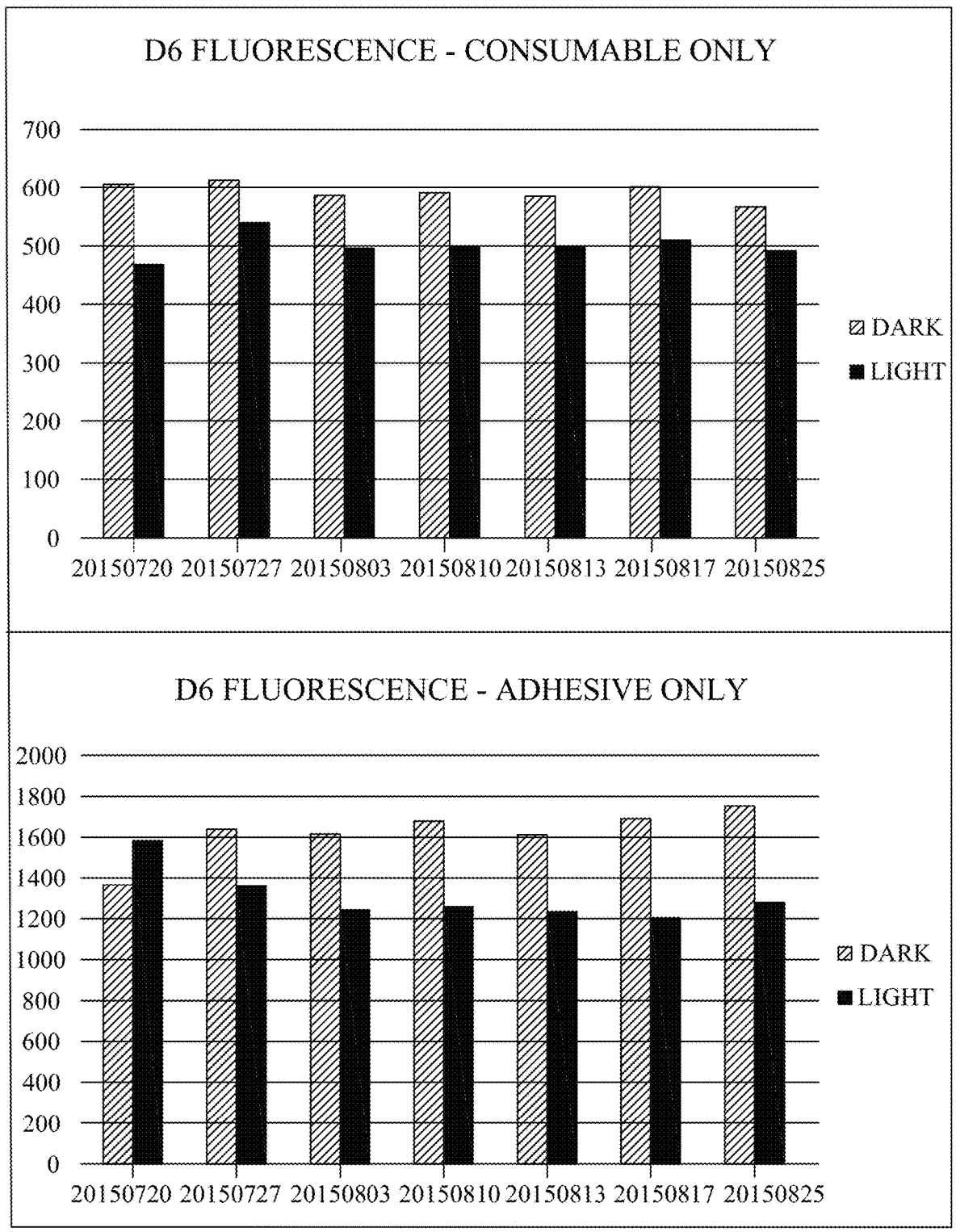
FIG. 6 illustrates data comparing the fluorescence over time of a multi-well plate alone and a multi-well plate with adhesive in the wells.

The response of the QDs used in the standard of Example 1 should be stable. It is known, however, that the plate and the adhesive provide some background fluorescence. In order to determine possible sources for the mild drop off in fluorescence response in Example 1, the fluorescent response of the plate and the adhesive were studied as a function of time and storage in the dark and in the light. FIG. 6 illustrates data for the plate and the adhesive.

It was found that the background fluorescence of the plate (upper panel) did not change over time and was unaffected by storage in the dark or the light. In contrast, it was found that the background fluorescence contributed by the adhesive could be affected by exposure to ambient light. In the lower panel, data is shown illustrating this. The fluorescence of the plate with adhesive stored in the dark did not change over time, but there was some drop off in the fluorescence from the adhesive that was exposed to ambient light.

Figure 10:
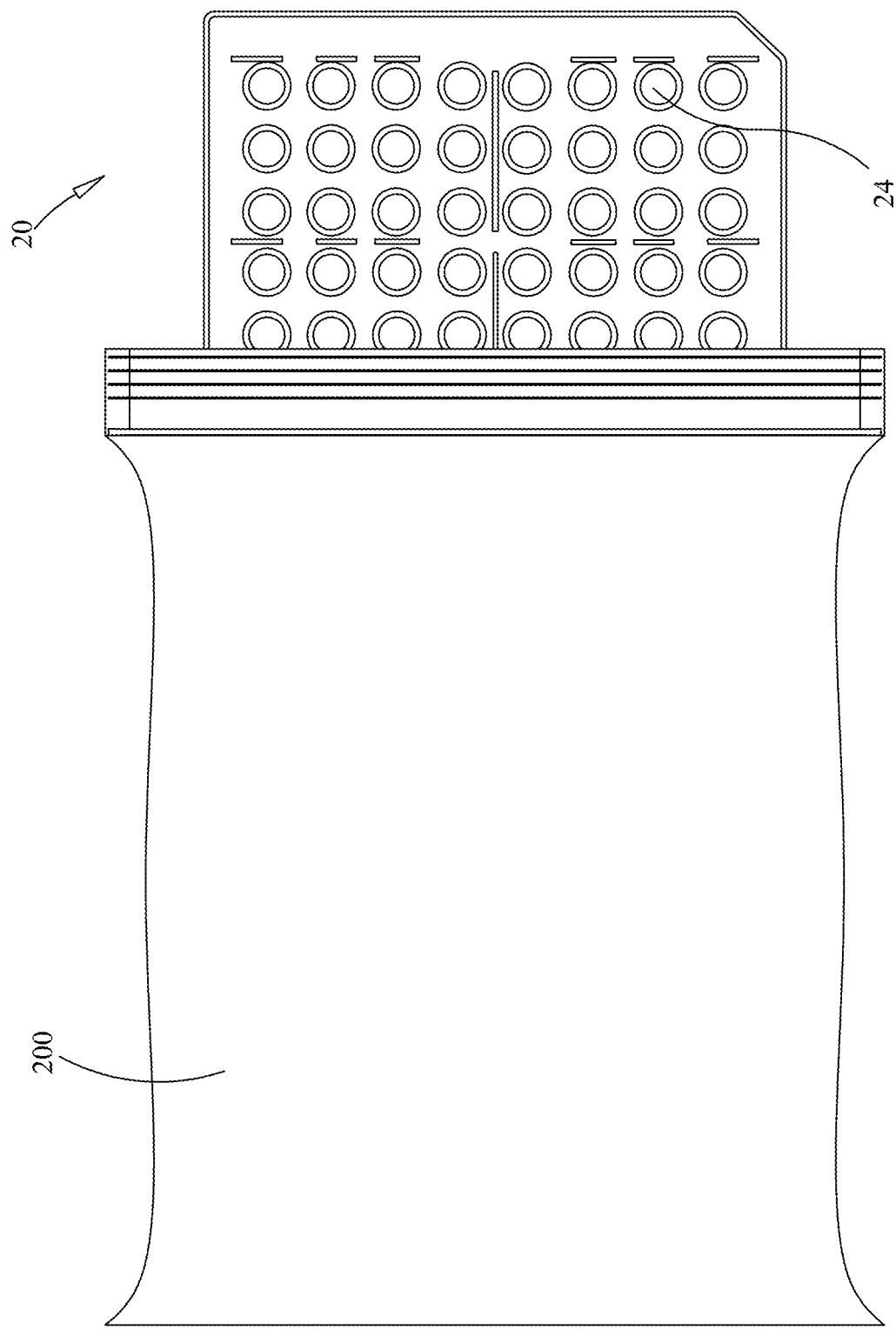
FIG. 10 illustrates a solid fluorescence standard in a multi-well format plate (e.g., a 96-well plate) and a storage container, according to one embodiment of the present disclosure.

Based on these data, the inventors determined that it might be best to protect the fluorescent standard from ambient light, illustratively by storing the plate in an opaque container (e.g., a bag, a box, or the like) when not in use. For instance, the fluorescence standard may be stored in a light-tight bag, such as a bag made from an aluminized mylar film. Such a storage container also has the advantage of protecting the fluorescence standard for dust and dirt that may settle on the standard when it is not in use. An example of such a storage container is illustrated in FIG. 10. In FIG. 10, a 96-well plate 20 having one or more wells that include the fluorescence standard described herein may be stored in a light-tight bag 200. Such a bag 200 may be made from an aluminized mylar film, an opaque plastic, or the like.

Example 3

Figure 7:
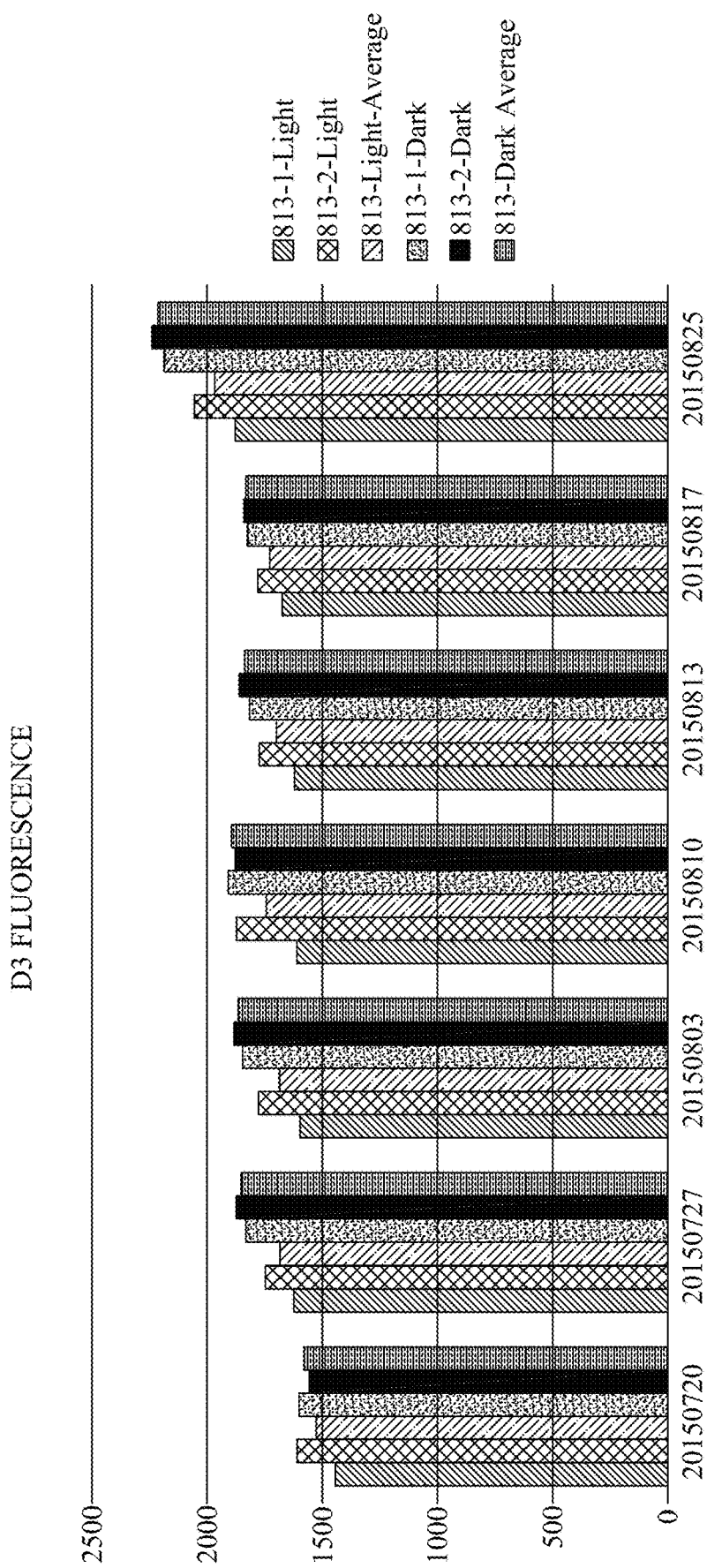
FIG. 7 illustrates data comparing the fluorescence response of several fluorescence standards stored in the dark and in the light over time.

Referring to FIG. 7, data are shown comparing the response of fluorescence standards stored in ambient light and in the dark. It was found that the response for the light and dark stored standards performed consistently with one another. Note: Last data point was performed after the instrument was recalibrated.

Example 4

Figure 8:
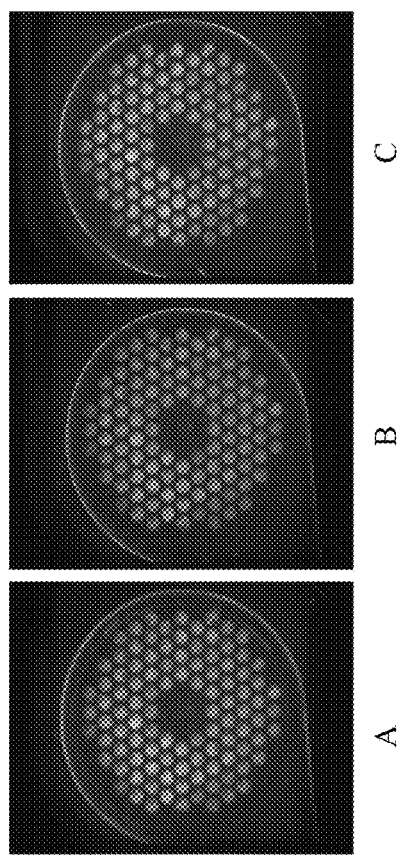
FIG. 8 illustrates several FilmArray standards and calibration data.
Figure 8:
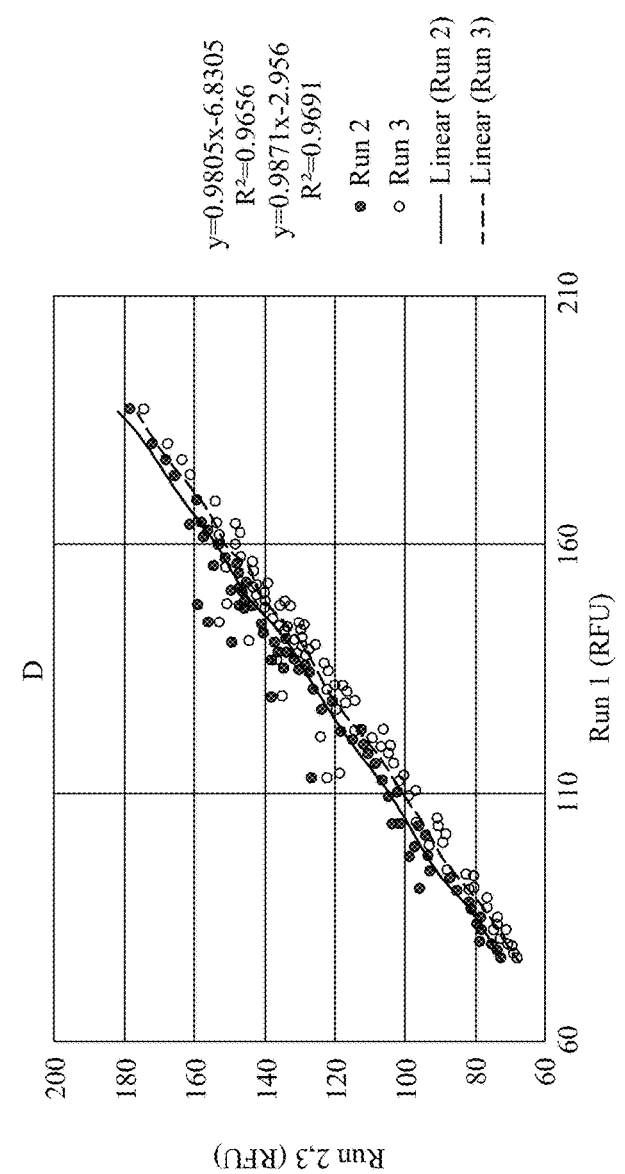

The second-stage of a FilmArray pouch was filled with a mixture similar to that used in Example 1 and allowed to cure. This second stage was placed into a FilmArray pouch to generate a calibrator pouch. Referring to FIG. 8, data are shown illustrating that the calibrator pouch can be filled with the adhesive and the QDs and that such a standard can be used to calibrate the response of a FilmArray instrument. The calibrator pouch was run on three FilmArray instruments (top row) and the results of three runs on one instrument are shown below.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A solid fluorescence standard, comprising
   a solid matrix; and
   a selected quantity of substantially non-photobleaching fluorescent particles dispersed in the solid matrix, wherein the substantially non-photobleaching fluorescent particles are one or more of quantum dots, powdered fluorescent glass, or fluorescent plastic,
   wherein the solid matrix is formed from a liquid adhesive having a viscosity of 10-100 centipoise at 15-25° C. prior to curing, and
   wherein the substantially non-photobleaching fluorescent particles are evenly dispersed in the liquid adhesive before and after curing.

2. The solid fluorescence standard of claim 1, wherein the adhesive is a low viscosity, substantially optically transparent, solvent-free, radiation curable adhesive.

3. The solid fluorescence standard of claim 1, wherein the liquid adhesive has a viscosity of 15-25 centipoise at 15-25° C. prior to curing.

4. The solid fluorescence standard of claim 1, wherein the substantially non-photobleaching fluorescent particles are included in the solid matrix at a concentration adapted for providing a defined emission intensity at a selected wavelength and excitation intensity.

5. The solid fluorescence standard of claim 1, wherein the substantially non-photobleaching fluorescent particles are quantum dots and are included in the solid matrix at a concentration of about 0.01 µg/ml to about 10 µg/ml.

6. The solid fluorescence standard of claim 1, wherein the substantially non-photobleaching fluorescent particles are quantum dots and are included in the solid matrix at a concentration of about 0.05 µg/ml to about 1 µg/ml.

7. The solid fluorescence standard of claim 1, wherein the substantially non-photobleaching fluorescent particles are quantum dots and are included in the solid matrix at a concentration of about 0.075 µg/ml to about 0.2 µg/ml.

8. The solid fluorescence standard of claim 1, wherein substantially non-photobleaching fluorescent particles absorb and emit light in the range of about 350 nm to 850 nm.

9. The solid fluorescence standard of claim 8, wherein the substantially non-photobleaching fluorescent particles include at least a first quantum dot having a green emission wavelength.

10. The solid fluorescence standard of claim 9, wherein the substantially non-photobleaching fluorescent particles include at least a second quantum dot having a red emission wavelength.

11. The solid fluorescence standard of claim 1, wherein the substantially non-photobleaching fluorescent particles are a mixture of different substantially non-photobleaching fluorescent particles of at least two different colors such that the mixture has a combined emissions spectrum that substantially matches an emissions spectrum of a selected fluorophore.

12. The solid fluorescence standard of claim 11, wherein the mixture is determined by solving for an over-determined set of equations, wherein $$Y = AX$$

and X is determined by solving for X using the least squares method:

$$X = (A^T A)^{-1} A^T Y$$

wherein:

T indicates a matrix transpose,

X is a vector solution, representing an optical concentration for each of the different substantially non-photobleaching fluorescent particles, Y is the vector of the spectra of the substantially non-photobleaching fluorescent particle that is to be approximated, and A is a matrix comprised of basis vectors for each of the different substantially non-photobleaching fluorescent particles.

13. The solid fluorescence standard of claim 1, wherein the substantially non-photobleaching fluorescent particles include at least a first quantum dot that absorbs in a range of about 450 nm to about 550 nm and that emits in a range of about 500 nm to 630 nm.

14. The solid fluorescence standard of claim 13, wherein the substantially non-photobleaching fluorescent particles include at least a second quantum dot that absorbs in a range of about 550 nm to about 650 nm and that emits in a range of about 630 nm to 720 nm.

15. The solid fluorescence standard of claim 1, wherein the solid fluorescence standard is fabricated as a sheet that is trimmable to yield one or more sections sized to be disposed in an instrument in need of calibration or sized to be disposed in an accessory that fits in an instrument in need of calibration.

16. The solid fluorescence standard of claim 1, wherein the liquid adhesive with the fluorescent particles dispersed therein is disposed in one or more portions of a self-contained analysis device or pouch prior to curing.

17. A solid fluorescence standard, comprising
a solid matrix comprising a cured liquid adhesive; and
a selected quantity of substantially non-photobleaching fluorescent particles dispersed in the cured liquid adhesive, the liquid adhesive being cured with the selected quantity of substantially non-photobleaching fluorescent particles dispersed in uncured liquid adhesive prior to curing,
wherein the substantially non-photobleaching fluorescent particles are evenly dispersed in the liquid adhesive before and after the liquid adhesive is cured, and
wherein the uncured liquid adhesive has a viscosity of 10-100 centipoise at 15-25° C. prior to curing.

18. The solid fluorescence standard of claim 1, wherein the solid fluorescence standard is fabricated by a process that includes dispersing the fluorescent particles in the liquid adhesive, and curing the adhesive to form the solid matrix.

19. The solid fluorescence standard of claim 1, wherein the adhesive is a UV curable adhesive.

* * * * *